United States Patent
Kim et al.

(10) Patent No.: US 9,492,789 B2
(45) Date of Patent: Nov. 15, 2016

(54) DRAW SOLUTE FOR FORWARD OSMOSIS, FORWARD OSMOSIS WATER TREATMENT DEVICE, AND FORWARD OSMOSIS METHOD FOR WATER TREATMENT

(75) Inventors: Jae Eun Kim, Gyeonggi-do (KR); Bo Kyung Jung, Gyeonggi-do (KR); Sung Soo Han, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1059 days.

(21) Appl. No.: 13/488,775

(22) Filed: Jun. 5, 2012

(65) Prior Publication Data
US 2013/0180919 A1  Jul. 18, 2013

(30) Foreign Application Priority Data
Jan. 17, 2012 (KR) .................. 10-2012-0005383

(51) Int. Cl.
| | |
|---|---|
| *C02F 1/44* | (2006.01) |
| *C07C 323/25* | (2006.01) |
| *C08G 75/00* | (2006.01) |
| *B01D 61/00* | (2006.01) |
| *C08F 22/38* | (2006.01) |

(52) U.S. Cl.
CPC .......... *B01D 61/005* (2013.01); *B01D 61/002* (2013.01); *C02F 1/445* (2013.01); *C08F 22/38* (2013.01); *C02F 2209/02* (2013.01)

(58) Field of Classification Search
USPC ............... 528/368; 526/303.1, 193, 217, 225
See application file for complete search history.

(56) References Cited

U.S. PATENT DOCUMENTS

| | | | |
|---|---|---|---|
| 6,663,965 | B2 | 12/2003 | Poncelet |
| 2002/0098567 | A1 | 7/2002 | Vaidya et al. |
| 2003/0018136 | A1 | 1/2003 | Poncelet |
| 2005/0130867 | A1 | 6/2005 | Vaidya et al. |
| 2005/0145568 | A1 | 7/2005 | Mc Ginnis |
| 2010/0155329 | A1 | 6/2010 | Iyer |
| 2012/0211423 | A1 | 8/2012 | Kim et al. |

FOREIGN PATENT DOCUMENTS

| | | |
|---|---|---|
| CN | 102642894 | 8/2012 |
| EP | 1832341 A1 | 9/2007 |
| EP | 2 489 424 | 8/2012 |
| KR | 20050056288 A | 6/2005 |
| KR | 20110065291 A | 6/2011 |

OTHER PUBLICATIONS

Zhang et al. (Macromol. Rapid Commun. 2004, 25, 1563-1567).*
Takei et al. (Bioconjugate Chem. 1993, 4, 42-46).*
Shan et al. (Macromolecules 2009, 42, 2696-2701).*
"Smart Polymers for Bioseparation and Bioprocessing," edited by Galaev and Mattiasson, Taylor & Francis, 2002, pp. 21 and 22.*

(Continued)

*Primary Examiner* — Vu A Nguyen
(74) *Attorney, Agent, or Firm* — Harness, Dickey & Pierce, P.L.C.

(57) ABSTRACT

A draw solute for forward osmosis may include a temperature-sensitive oligomer compound including a structural unit including a temperature-sensitive moiety. The temperature-sensitive oligomer compound may further include a hydrophilic functional group at the terminal end of the main chain.

18 Claims, 3 Drawing Sheets

(56) References Cited

OTHER PUBLICATIONS

Chinese Office Action dated Jun. 3, 2015, issued in Chinese Patent Application No. 201310016886.4.
Li, et al., "Stimuli-responsive polymer hydrogels as a new class of draw agent for forward osmosis desalination", Chemical Comunication, vol. 47, 2011, pp. 1710-1712 and Supplementary Information, Experimental Section, pp. S1-S5.

European Search Report dated Apr. 2, 2013, issued in European Patent Application No. 13151506.6.
Li, et al., "Composite polymer hydrogels as draw agents in forward osmosis and solar dewatering", Soft Matter, vol. 7, 2011, pp. 10048-10056.
Inoue, et al., "Temperature sensitivity of a hydrogel network containing different LCST oligomers grated to the hydrogel backbone", Polymer Gels and Networks, 1997, pp. 561-575.

* cited by examiner

DRAW SOLUTE FOR FORWARD OSMOSIS, FORWARD OSMOSIS WATER TREATMENT DEVICE, AND FORWARD OSMOSIS METHOD FOR WATER TREATMENT

CROSS-REFERENCE TO RELATED APPLICATION

This application claims priority under 35 U.S.C. §119 to Korean Patent Application No. 10-2012-0005383, filed in the Korean Intellectual Property Office on Jan. 17, 2012, the entire contents of which are incorporated herein by reference.

BACKGROUND

1. Field

Example embodiments relate to a draw solute for forward osmosis, a forward osmosis water treatment device using the same, and a forward osmosis method for water treatment.

2. Description of the Related Art

In general, desalination through reverse osmosis is commonly known in the field of water treatment. Osmosis (i.e., forward osmosis) refers to a phenomenon in which water in a portion of lower concentration moves to a solution of higher concentration. On the other hand, reverse osmosis desalination is a process of artificially adding a relatively high pressure to move water in the opposite direction, thereby producing fresh water. Since reverse osmosis requires a relatively high pressure, it has higher energy consumption. Recently, to increase energy efficiency, forward osmosis that uses the principle of osmotic pressure has been suggested, and a solute for the osmosis draw solution including ammonium bicarbonate, sulfur dioxide, aliphatic alcohols, aluminum sulfate, glucose, fructose, potassium nitrate, and the like have been used. Among them, an ammonium bicarbonate draw solution is most commonly known, and may be decomposed into ammonia and carbon dioxide and separated at a temperature of about 60° C. after forward osmosis. Further, newly suggested draw solution materials include magnetic nanoparticles having a hydrophilic peptide attached thereto (separated by a magnetic field), a polymer electrolyte such as a dendrimer (separated by a UF or NF membrane), and the like.

In the case of ammonium bicarbonate, it should be heated to about 60° C. or more so as to be vaporized, thus requiring higher energy consumption, and since complete removal of ammonia is practically difficult, it is impossible to use it as drinking water due to the odor of ammonia. In the case of the magnetic nanoparticles, it is difficult to redisperse magnetic particles that are separated and agglomerated by a magnetic field. It is also difficult to completely remove the nanoparticles, and thus toxicity of the nanoparticles should be considered. Polymer ion (dendrimer, protein, etc.) technology requires a nanofiltration or ultrafiltration membrane filter due to the $R_H$ size of the polymer of several to tens of nanometers, and it is also difficult to redisperse the agglomerated polymer after filtering.

SUMMARY

Various embodiments relate to a draw solute for forward osmosis having a relatively low energy requirement for separation and recovery.

Various embodiments relate to a forward osmosis water treatment device using an osmosis draw solution including the draw solute for forward osmosis.

Various embodiments relate to a forward osmosis method for water treatment using the draw solute for forward osmosis.

According to a non-limiting embodiment, a draw solute for forward osmosis may include a temperature-sensitive oligomer compound including a structural unit including a temperature-sensitive moiety. The temperature-sensitive oligomer compound further includes a hydrophilic functional group at the terminal end of the main chain, wherein the temperature-sensitive moiety is a monovalent substituent represented by the following Chemical Formula 1, a monovalent substituent represented by the following Chemical Formula 2, or a divalent substituent represented by the following Chemical Formula 3.

  [Chemical Formula 1]

wherein, in the above Chemical Formula 1,
$R^1$ and $R^2$ are each independently hydrogen; or a linear or branched C3 to C5 alkyl group, provided that at least one of $R^1$ and $R^2$ is not hydrogen,

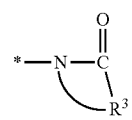  [Chemical Formula 2]

wherein, in the above Chemical Formula 2,
$R^3$ is a C3 to C5 alkylene group, and

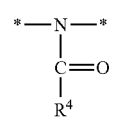  [Chemical Formula 3]

wherein, in the above Chemical Formula 3,
$R^4$ is a linear or branched C3 to C5 alkyl group.

The hydrophilic functional group may include an unshared electron pair.

The draw solute may further include a salt compound linked to the unshared electron pair of the hydrophilic functional group.

The hydrophilic functional group may be —COOH, —NH2, —SO3H, or —PO3H2.

The temperature-sensitive oligomer compound may have a number average molecular weight of about 300 to about 3000.

The temperature-sensitive oligomer compound may include one selected from a structural unit represented by the following Chemical Formula 4, a structural unit represented by the following Chemical Formula 5, a structural unit represented by the following Chemical Formula 6, and a combination thereof.

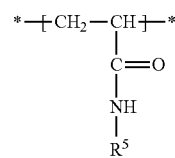  [Chemical Formula 4]

-continued

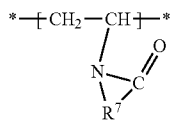
[Chemical Formula 5]

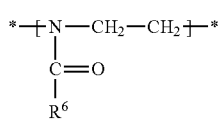
[Chemical Formula 6]

In Chemical Formulas 4 to 6, $R^5$ and $R^6$ are each independently a linear or branched C3 to C5 alkyl group, and $R^7$ is a C3 to C5 alkylene group.

The temperature-sensitive oligomer compound may include n of the structural unit represented by the above Chemical Formula 4, the structural unit represented by the above Chemical Formula 5, the structural unit represented by the above Chemical Formula 6, and a combination thereof, wherein n may be an integer of 2 to 30.

The temperature-sensitive oligomer compound may include a structural unit derived from a monomer selected from N-isopropylacrylamide (NIPAM), N,N-diethylacrylamide (DEAAM), N-vinylcaprolactam (VCL), and a combination thereof.

The temperature-sensitive oligomer compound may have a solubility in water of greater than or equal to about 100 g/L at a temperature of less than a lower critical solution temperature (LCST), and a solubility in water of less than or equal to about 1 g/L at a temperature of greater than or equal to the lower critical solution temperature (LCST).

The lower critical solution temperature (LCST) may be about 10 to about 50° C.

Side chains of the temperature-sensitive oligomer compound may form a hydrogen bond with water at a temperature of less than the lower critical solution temperature (LCST), and the side chains of the temperature-sensitive oligomer compound may form a hydrogen bond therebetween to be agglomerated at a temperature of greater than or equal to the lower critical solution temperature (LCST).

The temperature-sensitive oligomer compound may have a hydraulic radius of particles of about 100 nm to about 10,000 nm at a temperature of greater than or equal to the lower critical solution temperature (LCST).

According to another non-limiting embodiment, a forward osmosis water treatment device may include a feed solution including subject materials to be separated for purification; an osmosis draw solution including the draw solute for forward osmosis; a semi-permeable membrane contacting the feed solution on one side and the osmosis draw solution on the other side; a recovery system configured to separate and recover the draw solute of the osmosis draw solution; and a connector configured to reintroduce the draw solute of the osmosis draw solution that is recovered by the recovery system back into the osmosis draw solution contacting the semi-permeable membrane.

The forward osmosis water treatment device may further include an outlet configured to produce treated water from the rest of the osmosis draw solution after the draw solute is separated by the recovery system, which includes water that has passed through the semi-permeable membrane from the feed solution by osmotic pressure.

The recovery system may include a temperature controller to heat the draw solute to greater than or equal to a lower critical solution temperature (LCST) so as to agglomerate the draw solute.

The connector may include a temperature controller to cool the recovered draw solute to less than the lower critical solution temperature (LCST), in order to dissemble the agglomeration of the recovered draw solute.

The recovery system may include a microfiltration (MF) membrane, an ultrafiltration (UF) membrane, a nanofiltration (NF) membrane, or a centrifuge.

According to yet another non-limiting embodiment, a forward osmosis method for water treatment may include contacting a feed solution including impurities to be separated for purification and an osmosis draw solution including the draw solute for forward osmosis with a semi-permeable membrane positioned therebetween, so that feed water in the feed solution passes through the semi-permeable membrane by osmotic pressure and moves to the osmosis draw solution having a higher osmol concentration than the feed solution; heating the osmosis draw solution including the feed water that moved from the feed solution to a temperature above a lower critical solution temperature (LCST) so that the draw solute in the osmosis draw solution is reversibly self-agglomerated; separating and recovering the reversibly self-agglomerated draw solute from the osmosis draw solution including the feed water that moved from the feed solution; and producing treated water from the rest of the osmosis draw solution including feed water that moved from the feed solution, from which the reversibly self-agglomerated draw solute has been removed.

The forward osmosis method for water treatment may further include cooling the recovered draw solute to a temperature below the lower critical solution temperature (LCST) so as to dissemble the agglomerated draw solute and reintroduce the dissembled draw solute back into the osmosis draw solution contacting the semi-permeable membrane.

The lower critical solution temperature (LCST) may range from about 10 to about 50° C.

DETAILED DESCRIPTION

Figure 1:
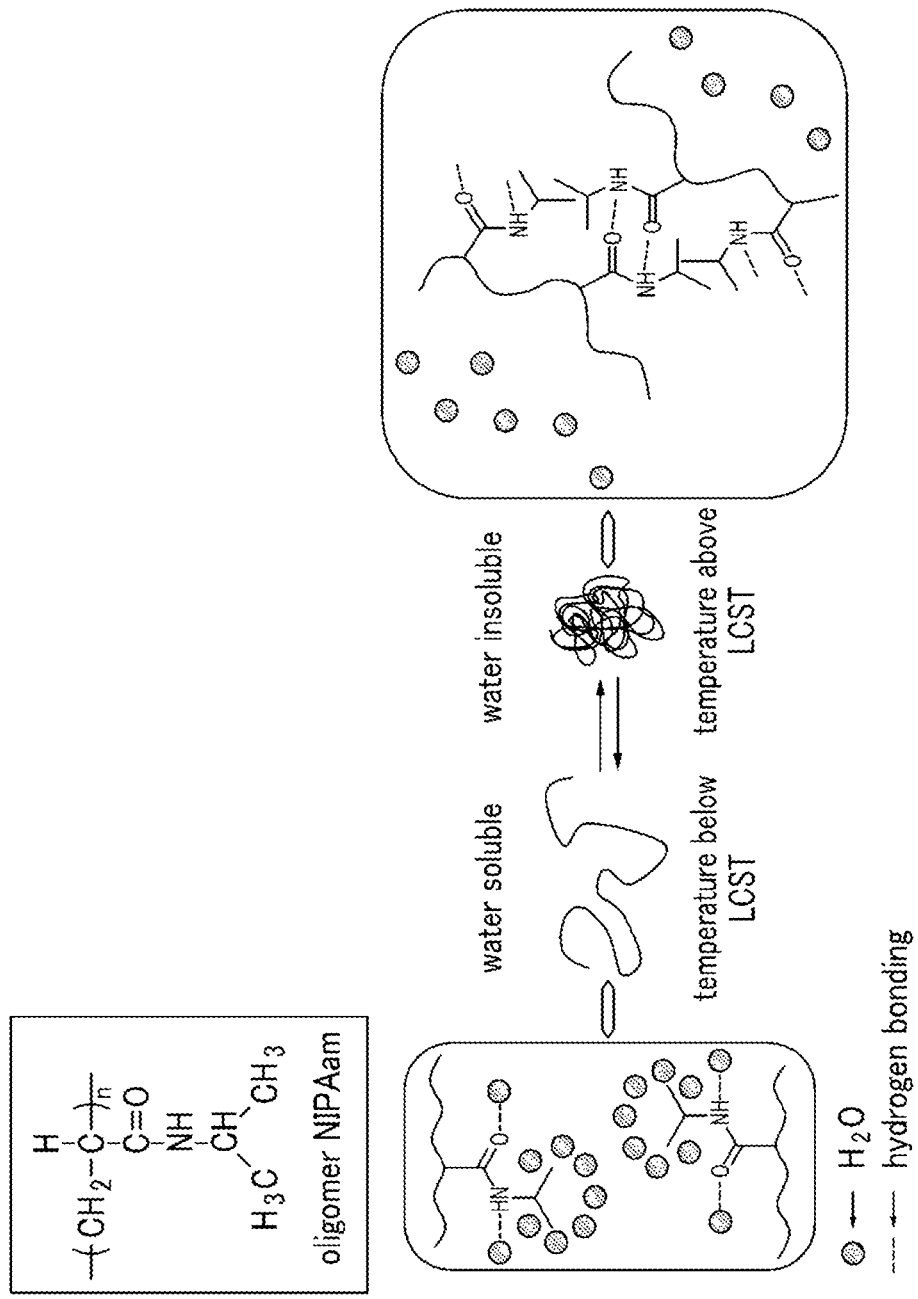
FIG. 1 is a schematic view showing the temperature sensitivity of a draw solute for forward osmosis including an N-isopropylacrylamide (NIPAam) oligomer according to a non-limiting embodiment.

This disclosure will be described more fully hereinafter in the following detailed description, in which various example embodiments of this disclosure are described. This disclosure may be embodied in many different forms and is not be construed as limited to the embodiments set forth herein.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, when a definition is not otherwise provided, the term "substituted" may refer to one substituted with a hydroxy group, a nitro group, a cyano group, an imino group (=NH or =NR', where R' is a C1 to C10 alkyl group), an amino group (—NH2, —NH(R") or —N(R") (R'''), where R" to R''' are each independently a C1 to C10 alkyl group), an amidino group, a hydrazine group, a hydrazone group, a carboxyl group, a C1 to C30 alkyl group, a C1 to C10 alkylsilyl group, a C3 to C30 cycloalkyl group, a C6 to C30 aryl group, a C2 to C30 heteroaryl group, a C1 to C10 alkoxy group, a halogen, a C1 to C10 fluoroalkyl group such as a trifluoromethyl group, and the like.

As used herein, when a definition is not otherwise provided, the prefix "hetero" may refer to one including 1 to 3 heteroatoms selected from N, O, S, and P, and remaining carbons in a compound or a substituent.

As used herein, when a definition is not otherwise provided, the term "combination thereof" refers to at least two substituents bound to each other by a linker, or at least two substituents condensed to each other.

As used herein, "*" may refer to an attachment point to the same or different atom or chemical formula.

As used herein, when a definition is not otherwise provided, the term "alkyl group" may refer to a "saturated alkyl group" without an alkenyl or alkynyl, or an "unsaturated alkyl group" with at least one alkenyl or alkynyl. The "alkenyl group" may refer to a substituent in which at least two carbon atoms are bound in at least one carbon-carbon double bond, and the term "alkyne group" refers to a substituent in which at least two carbon atoms are bound in at least one carbon-carbon triple bond.

The alkyl group may be a C1 to C30 linear or branched alkyl group, and more specifically a C1 to C6 alkyl group, a C7 to C10 alkyl group, or a C11 to C20 alkyl group.

For example, a C1 to C4 alkyl may have 1 to 4 carbon atoms, and may be selected from the group consisting of methyl, ethyl, propyl, iso-propyl, n-butyl, iso-butyl, sec-butyl, and t-butyl.

Examples of the alkyl group include a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, a cyclohexyl group, and the like.

The term "aromatic group" may refer to a substituent including a cyclic structure where all elements have p-orbitals which form conjugation. An aryl group and a heteroaryl group may be exemplified.

The term "aryl group" may refer to a monocyclic or fused ring-containing polycyclic (i.e., rings sharing adjacent pairs of carbon atoms) groups.

The "heteroaryl group" may refer to one including 1 to 3 heteroatoms selected from N, O, S, or P in an aryl group, and remaining carbons. When the heteroaryl group is a fused ring, each ring may include 1 to 3 heteroatoms.

The draw solute for forward osmosis according to one non-limiting embodiment may include a temperature-sensitive oligomer compound including a structural unit including a temperature-sensitive moiety. The temperature-sensitive oligomer compound further includes a hydrophilic functional group at the terminal end of the main chain.

The temperature-sensitive moiety may be a monovalent substituent represented by the following Chemical Formula 1, a monovalent substituent represented by the following Chemical Formula 2, or a divalent substituent represented by the following Chemical Formula 3.

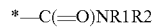 [Chemical Formula 1]

In the above Chemical Formula, $R^1$ and $R^2$ are each independently hydrogen; or a linear or branched C3 to C5 alkyl group, provided that at least one of $R^1$ and $R^2$ is not hydrogen.

[Chemical Formula 2]

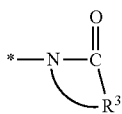

In the above Chemical Formula,
R³ is a C3 to C5 alkylene group.

[Chemical Formula 3]

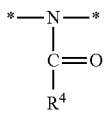

In the above Chemical Formula,
R⁴ is a linear or branched C3 to C5 alkyl group.

The draw solute for forward osmosis may be applicable to a forward osmosis process for water treatment.

The forward osmosis water treatment process allows water molecules to move from a feed solution to the osmosis draw solution by using an osmosis draw solution having a higher concentration than the feed solution, and then separates a draw solute from the osmosis draw solution, reuses it, and produces fresh water.

The forward osmosis draw solute lowers energy cost required in the separation and recovery of the draw solution during the forward osmosis process. In one non-limiting embodiment, the draw solute for forward osmosis includes the temperature-sensitive oligomer compound of which the hydrophilicity is controlled by temperature, so as to easily separate and recover the draw solute.

Since the temperature-sensitive oligomer compound remarkably decreases hydrophilicity at a high temperature, it is reversibly self-agglomerated and decreases solubility in water, and becomes dissoluble. The temperature-sensitive oligomer compound which is reversibly self-agglomerated at a high temperature increases the size of particles, so it may be easily separated from the osmosis draw solution. For example, the temperature-sensitive oligomer compound is easily separated from water since the temperature-sensitive oligomer compound is self-agglomerated at a temperature of higher than or equal to a predetermined or desired temperature, to generate a precipitate.

The temperature-sensitive oligomer compound formed in dissoluble particles having an increased size is easily separated by a microfiltration (MF) membrane, an ultrafiltration (UF) membrane, a nanofiltration (NF) membrane, or a centrifuge without consuming excessive energy.

The temperature-sensitive oligomer compound may be dissolved in water at a high concentration due to high hydrophilicity at a low temperature to provide an osmosis draw solution having a high concentration, so as to increase the osmotic pressure.

The term "temperature-sensitive" refers to a characteristic of being reversibly self-agglomerated as the temperature increases since the difference of solubility in water is huge between a high temperature and a low temperature.

The term "lower critical solution temperature (LCST)" refers to the lowest temperature at which the temperature-sensitive oligomer compound may be separated from a solution (the highest temperature of being well-dissolved in water), and the lower critical solution temperature of the temperature-sensitive oligomer compound may range from about 10 to about 50° C., for example, from about 25 to about 45° C., and particularly, from about 30 to about 40° C.

The side chain of the temperature-sensitive oligomer compound may form a hydrogen bond with water to be dissolved in water at a temperature of less than the lower critical solution temperature (LCST). On the other hand, the side chains of the temperature-sensitive oligomer compound form a hydrogen bond with another side chain of the temperature-sensitive oligomer compound rather than water, so that the temperature-sensitive oligomer compound precipitates as a reversibly self-agglomerated particle at a temperature of greater than or equal to the lower critical solution temperature (LCST).

The temperature-sensitive oligomer compound may have solubility in water of greater than or equal to about 100 g/L at a temperature of less than the lower critical solution temperature (LCST), and solubility in water of less than or equal to about 1 g/L at a temperature of greater than or equal to the lower critical solution temperature (LCST). For example, the temperature-sensitive oligomer compound may have solubility in water of about 200 g/L to about 800 g/L at a temperature of less than the lower critical solution temperature (LCST), and solubility in water of about 0.1 g/L to about 10 g/L at a temperature of greater than or equal to the lower critical solution temperature (LCST). Particularly, the temperature-sensitive oligomer compound may have solubility in water of about 500 g/L to about 800 g/L at a temperature of less than the lower critical solution temperature (LCST), and solubility in water of about 0.1 g/L to about 1 g/L at a temperature of greater than or equal to the lower critical solution temperature (LCST).

The draw solute for forward osmosis may further include a salt compound linked to the temperature-sensitive oligomer compound. The salt compound may induce higher osmotic pressure. Since the temperature-sensitive oligomer compound includes a hydrophilic functional group at the main chain, a composite of the salt compound and the temperature-sensitive oligomer compound may form by bonding the hydrophilic functional group with the salt compound.

The hydrophilic functional group may include an unshared electron pair. The unshared electron pair may be linked to the salt compound. The hydrophilic functional group may include, for example, —COOH, —NH2, —SO3H, —PO3H2, and the like.

The temperature-sensitive oligomer compound may have a number average molecular weight of about 300 to about 3000. The oligomer compound may have a number average molecular weight of about 300 to about 1000, and specifically the oligomer compound may have a number average molecular weight of about 300 to about 800. When the oligomer compound has a molecular weight within the above range, the draw solute for forward osmosis may provide a highly concentrated osmosis draw solution at a temperature below the lower critical solution temperature (LCST).

In one non-limiting embodiment, the temperature-sensitive oligomer compound may include one selected from a structural unit represented by the following Chemical Formula 4, a structural unit represented by the following Chemical Formula 5, a structural unit represented by the following Chemical Formula 6, and a combination thereof.

[Chemical Formula 4]

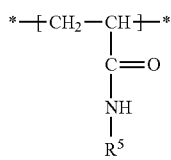

[Chemical Formula 5]

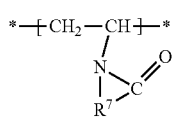

[Chemical Formula 6]

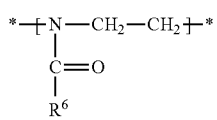

In Chemical Formulas 4 to 6, $R^5$ and $R^6$ are each independently a linear or branched C3 to C5 alkyl group, and $R^7$ is a C3 to C5 alkylene group.

For example, the temperature-sensitive oligomer compound may include n of the structural unit represented by the above Chemical Formula 4, the structural unit represented by the above Chemical Formula 5, the structural unit represented by the above Chemical Formula 6, and a combination thereof, wherein n may be an integer of about 2 to about 30.

The n may be an integer of about 2 to about 8, and specifically about 4 to about 6.

The temperature-sensitive oligomer compound may include a structural unit derived from a monomer selected from N-isopropylacrylamide (NIPAM), N,N-diethylacrylamide (DEAAM), N-vinylcaprolactam (VCL), and a combination thereof.

FIG. 1 is a schematic view showing a non-limiting embodiment of the draw solute, wherein the temperature-sensitive oligomer compound is poly(N-isopropylacrylamide) (PNIPAM). FIG. 1 shows that the agglomeration is not generated at a temperature below a lower critical solution temperature (LCST) as a result of forming a hydrogen bond between the oligomer side chain and a water molecule; that the agglomeration is generated at a temperature above the lower critical solution temperature (LCST) by forming a hydrogen bond between the oligomer side chains; and that the agglomeration may be reversibly generated and dissembled. According to the reversible self-agglomeration, the temperature-sensitive oligomer compound suddenly changes solubility in water around the lower critical solution temperature (LCST).

Since the temperature-sensitive oligomer compound is hydrophilic below the lower critical solution temperature (LCST), it has a relatively high solubility in water, which is suitable for an osmosis draw solution having a relatively high concentration. But since it is hydrophobic at a temperature of greater than or equal to the lower critical solution temperature (LCST), it is reversely self-agglomerated to precipitate such that it is easily separated from the osmosis draw solution, and it becomes hydrophilic by cooling the separated temperature-sensitive oligomer compound at a temperature of less than the lower critical solution temperature (LCST), so it is also easily reusable as an osmosis draw solution.

Since the temperature-sensitive oligomer compound is reversibly self-agglomerated at a temperature of greater than or equal to the lower critical solution temperature (LCST), the particle size of the temperature-sensitive oligomer compound rapidly increases at a temperature of greater than or equal to the lower critical solution temperature (LCST) relative to the temperature of less than the lower critical solution temperature (LCST).

The temperature-sensitive oligomer compound having an increased particle size, which is a particle of the temperature-sensitive oligomer compound at a temperature of greater than or equal to the lower critical solution temperature (LCST), has a hydraulic radius of, for example, about 100 nm to about 10,000 nm.

According to another non-limiting embodiment, a forward osmosis water treatment device using the forward osmosis draw solute is provided.

The forward osmosis water treatment device may include a feed solution including subject materials to be separated for purification; an osmosis draw solution including the draw solute for forward osmosis; a semi-permeable membrane contacting the feed solution on one side and the osmosis draw solution on the other side; a recovery system for separating and recovering the draw solute of the osmosis draw solution; and a connector configured to reintroduce the draw solute of the osmosis draw solution that is recovered by the recovery system into the osmosis draw solution contacting the semi-permeable membrane.

The semi-permeable membrane is a semi-permeable separation layer for forward osmosis which is permeable for water and non-permeable for the subject materials to be separated.

The detailed description of draw solute for forward osmosis is the same as in the above.

The osmosis draw solution may control the concentration to provide a higher osmotic pressure than treated water. According to one non-limiting embodiment, the osmosis draw solution including the draw solute at a concentration of about 10 wt % may provide an osmotic pressure of about 13 atm. According to another non-limiting embodiment, the osmosis draw solution including the draw solute at a concentration of about 50 wt % may provide an osmotic pressure of about 30 atm.

The forward osmosis water treatment device may further include an outlet configured to produce treated water from the rest of the osmosis draw solution after the draw solute is separated by the recovery system, which includes water that has passed through the semi-permeable membrane from the feed solution by osmotic pressure.

According to the operation mechanism of the forward osmosis water treatment device, water in the feed solution to be treated passes through the semi-permeable membrane and moves to the osmosis draw solution of a higher concentration by osmotic pressure, the osmosis draw solution including the water from the feed solution moves to the recovery system, the draw solute for forward osmosis is separated, and the rest of the osmosis draw solution after the draw solute is separated by the recovery system is output and obtained as treated water. The separated draw solute for forward osmosis may be reused by reintroducing it into the osmosis draw solution contacting the feed solution to be treated having the semi-permeable membrane in between.

In the recovery system, the draw solute for forward osmosis may be separated and recovered by the advantage of the temperature-sensitive characteristics of the temperature-sensitive oligomer compound as described above. In other words, the recovery system includes a temperature controller, so the temperature-sensitive oligomer compound may be reversibly self-agglomerated by being heated to a temperature of greater than or equal to the lower critical solution temperature (LCST) for the particle size of the draw solute to increase, and filtered to be separated.

The filtration may use a microfiltration (MF) membrane, an ultrafiltration (UF) membrane, a nanofiltration (NF) membrane, a centrifuge, or the like. Since particularly a self-aggregated particle of a microsize may be filtered and separated using a microfiltration membrane, the recovery system may reduce operation energy use.

In order to add the separated and recovered draw solute of the temperature-sensitive oligomer compound into the osmosis draw solution contacting the feed solution and reuse it, the recovered draw solute is cooled to a temperature of less than the lower critical solution temperature (LCST) for the solubility to the osmosis draw solution to increase again. Accordingly, the connector may include a temperature controller for cooling to a temperature of less than the lower critical solution temperature (LCST). By using the temperature controller, the draw solute in which agglomeration is dissembled by cooling the recovered draw solute to a temperature of less than the lower critical solution temperature (LCST) may be reintroduced into the osmosis draw solution contacting the semi-permeable membrane.

When the temperature-sensitive oligomer compound is used for a draw solute for forward osmosis, the forward osmosis process is performed at a temperature of less than or equal to the lower critical solution temperature (LCST), and the draw solute is easily separated and recovered by controlling the temperature to greater than or equal to the lower critical solution temperature (LCST) in the recovery system. In addition, the temperature-sensitive oligomer compound may have the lower critical solution temperature (LCST) of about 10 to about 50° C. which is relatively low, so the high temperature condition is not required when recovering the draw solute, which is preferable in the view of operation energy reduction.

The forward osmosis water treatment device has a merit of reusing the draw solute recovered simply by controlling the temperature as in the above.

The feed solution may be sea water, brackish water, ground water, wastewater, and the like. For example, sea water may be purified with the forward osmosis water treatment device to obtain drinking water.

According to yet another non-limiting embodiment, a forward osmosis method for water treatment may include contacting a feed solution including impurities to be separated for purification and an osmosis draw solution including the draw solute for forward osmosis with a semi-permeable membrane positioned therebetween, so that water in the feed solution passes through the semi-permeable membrane by osmotic pressure and moves to the osmosis draw solution having a higher osmol concentration than a feed solution; heating the osmosis draw solution including water that moves from the feed solution to a temperature above a lower critical solution temperature (LCST) so that a draw solute in the osmosis draw solution is reversibly self-agglomerated; separating and recovering the reversibly self-agglomerated draw solute from the osmosis draw solution including water that moves from the feed solution; and producing treated water of the rest of the osmosis draw solution including water that moves from the feed solution, from which the reversibly self-agglomerated draw solute has been removed.

The detailed description of the draw solute for forward osmosis is the same as in the above.

The forward osmosis method for water treatment may further include cooling the recovered draw solute to a temperature below the lower critical solution temperature (LCST) so as to dissemble the agglomerated draw solute and reintroduce it into the osmosis draw solution contacting the semi-permeable membrane.

The lower critical solution temperature (LCST) may range from about 10 to about 50° C. as mentioned above.

Figure 2:
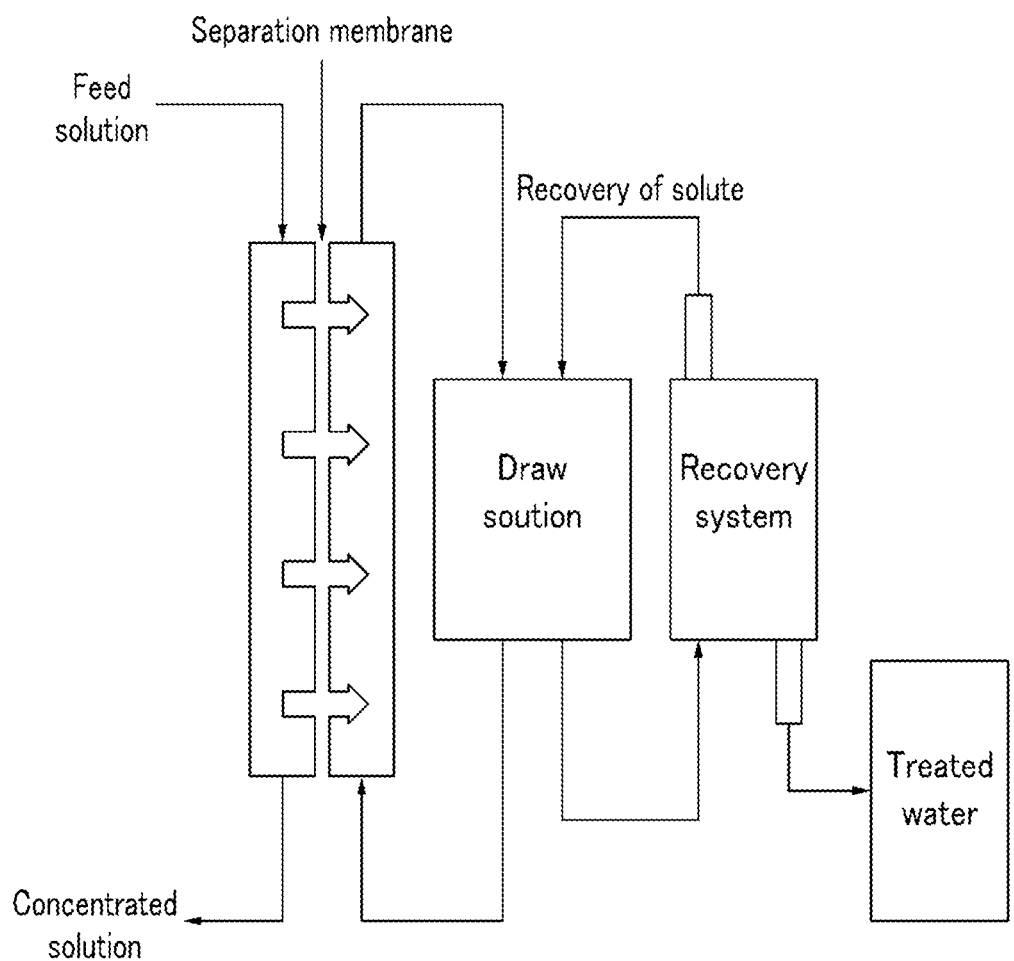
FIG. 2 is a schematic view of a forward osmosis water treatment device according to a non-limiting embodiment.

FIG. 2 is a schematic view of the forward osmosis water treatment device that may be operated according to the forward osmosis method for water treatment.

EXAMPLE

Example 1

Synthesis of Temperature-Sensitive Oligomer Compound

A NIPAam (N-isopropylacrylamide) oligomer represented by the following Chemical Formula 7 is synthesized according to radical polymerization. 6 g (0.053 mol) of a purified NIPAam monomer, 0.1897 g (0.0016 mol) of a chain transfer agent of aminoethanethiol hydrochloride (AET-HCl), 0.087 g (0.001 mol) of azobisisobutyronitrile (AIBN), and 31.34 mL of dimethylformamide (DMF) are reacted in a 3-neck round-bottom flask at 75° C. under a nitrogen condition for 15 hours. A polymerized NIPAam oligomer is purified with diethylether and dried in a vacuum oven for one day.

Figure 3:
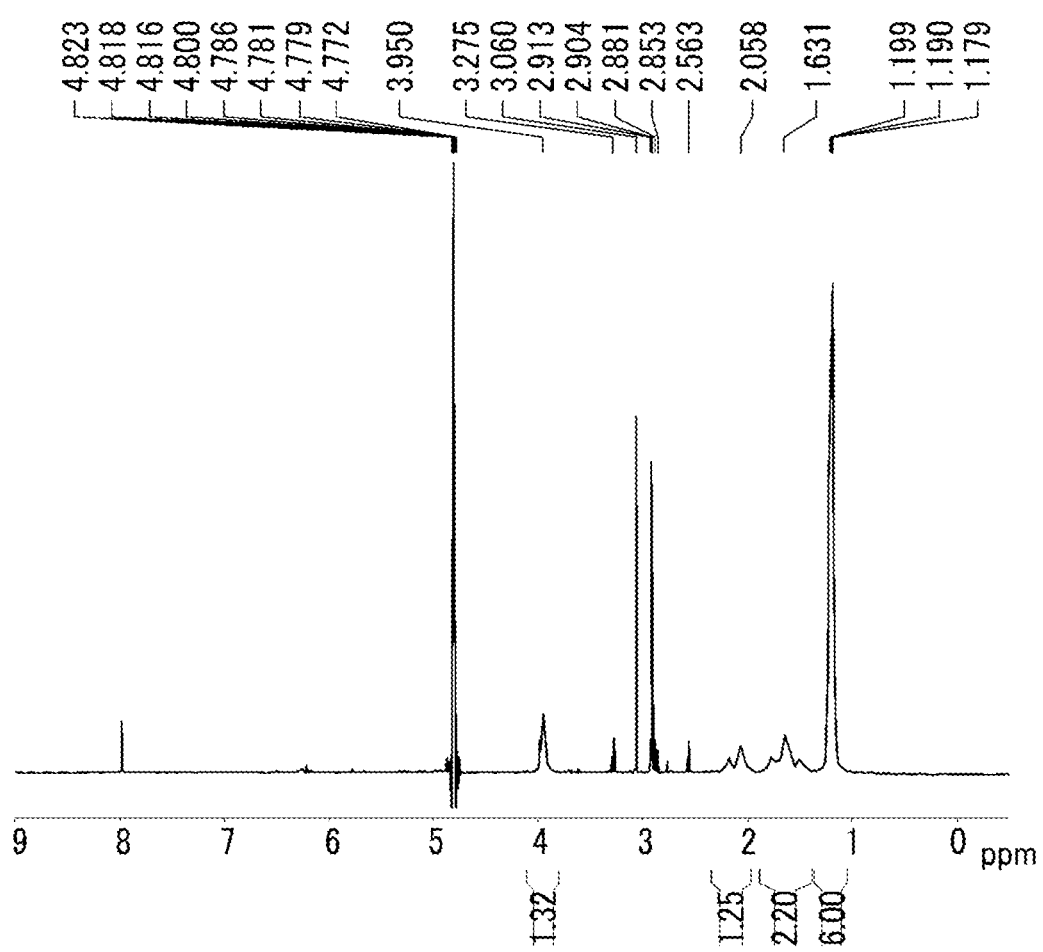
FIG. 3 shows an NMR analysis spectrum of the NIPAam oligomer synthesized in Example 1.

FIG. 3 shows an NMR analysis spectrum of the NIPAam oligomer synthesized in Example 1.

[Chemical Formula 7]

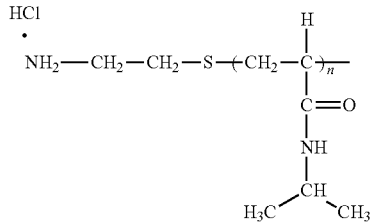

In the above Chemical Formula, n refers to a polymerization degree.

Example 2

Synthesis of Temperature-Sensitive Oligomer Compound

According to the same procedure as in Example 1, a compound having a different disposition is synthesized. The molecular weight is slightly different since the degree of polymerization is different due to the subtle quantitative difference. This is designated Example 2.

Example 3

Synthesis of Temperature-Sensitive Oligomer Compound

According to the same procedure as in Example 1, a compound having a different disposition is synthesized. The molecular weight is slightly different from Example 1 and Example 2 since the degree of polymerization is different due to the subtle quantitative difference. This is designated Example 3.

Example 4

Synthesis of Temperature-Sensitive Oligomer Compound

A NIPAam oligomer is synthesized in accordance with the same procedure as in Example 1, and then triethylamine is added at twice the amount of mole ratio of the NIPAam oligomer thereto and reacted for 24 hours to remove HCl, purified by diethylether, and dried in a vacuum oven for one night.

Example 5

Temperature-Sensitive Oligomer Compound

A commercially available reagent (NIPAam, COOH terminated) sold by Sigma-Aldrich having COOH instead of $NH_2$ in the oligomer terminal end of Example 4 is used.

Comparative Example 1

N-isopropylacrylamide monomolecular compound is prepared.

Experimental Example 1

Molecular Weight

Through a $^1$H-NMR analysis, a degree of polymerization is calculated to provide a number average molecular weight of each example.

Experimental Example 2

Preparation of Osmosis Draw Solution and Osmotic Pressure Analysis

Osmosis draw solutions having the various concentrations shown in the following Table 1 are prepared, and the osmotic pressure of the osmosis draw solution including the NIPAam oligomer prepared from Examples 1 to 4 is analyzed using the osmotic pressure measurer according to a freezing point depression.

Comparing the results of osmotic pressure according to molecular weight in Example 1 and Example 2, Example 1 having a lower molecular weight shows the highest osmotic pressure of 5.31 atm in a 10 wt % solution. It is shown that the osmotic pressure is linearly proportional to the concentration of the solution, and in Example 1, the solution of 30 wt % has the osmotic pressure of 17 atm. The solubility in water of the NIPAam oligomer synthesized in Example 1 is 500 g/L or more, which enables to produce a draw solution having a concentration of 50 wt % or more. In this case, the osmotic pressure is anticipated to be increased to nearly 30 atm.

From the results of Example 1 and Example 4, the osmotic pressure change may be observed according to whether or not an HCl salt is present in the oligomer terminal end. Example 1 including the HCl salt has osmotic pressure per mole of 31 atm; Example 4 including no HCl salt has osmotic pressure per mole of 25 atm. Thereby, it is understood that the case including the HCl salt increases the osmotic pressure by greater than or equal to 20%.

TABLE 1

| | Number average molecular weight | Concentration (wt %) | Osmotic pressure | |
|---|---|---|---|---|
| | | | Osmol concentration (mOsmol/kg) | atm (equivalents) |
| Example 1 | 575 | 30 | 700 | 17.07 |
| | | 20 | 513 | 12.51 |
| | | 10 | 218 | 5.31 |
| Example 2 | 656 | 10 | 195 | 4.75 |
| Example 3 | 735 | 10 | 179 | 4.36 |
| Example 4 | 538 | 10 | 187 | 4.56 |
| Example 5 | 2,000 | 10 | 54.25 | 2.05 |
| Comparative Example 1 | 113.6 | 10 | 738 | 18 |

Experimental Example 3

Evaluation of Forward Osmosis Water Treatment According to Temperature

Each osmosis draw solution including the compounds of Examples 1 to 5 and Comparative Examples 1 and 2 at a concentration of 10 wt % is slowly heated from room temperature, and the solubility change of the solution is observed according to the temperature. The term "lower critical solution temperature (LCST)" indicates the temperature at which the solution begins to suddenly turn opaque, and the term "separation temperature" indicates the temperature in which the solution begins to be precipitated. The results are shown in the following Table 2.

TABLE 2

| | Example 1 | Example 2 | Example 3 | Example 4 | Example 5 | Comparative Example 1 |
|---|---|---|---|---|---|---|
| LCST (° C.) | 31-32 | 31-32 | 31-32 | 31-32 | 31-32 | 36-37 |
| Separation temperature (° C.) | 32-33 | 32-33 | 32-33 | 32-33 | 32-33 | Opaque at 60° C. Not precipitated. |
| Reversibility (@ 25° C.) | ○ | ○ | ○ | ○ | ○ | ○ |

While this disclosure has been described in connection with what is presently considered to be various example embodiments, it is to be understood that the disclosure is not limited to the disclosed embodiments, but, on the contrary, is intended to cover various modifications and equivalent arrangements included within the spirit and scope of the appended claims.

What is claimed is:

1. A draw solute for forward osmosis, the draw solute comprising:
    a temperature-sensitive oligomer compound having a main chain with a terminal end, the temperature-sensitive oligomer compound including a structural unit including a temperature-sensitive moiety, the temperature-sensitive oligomer compound further including a hydrophilic functional group at the terminal end of the main chain, the temperature-sensitive moiety being a first monovalent substituent represented by the following Chemical Formula 1, a second monovalent substituent represented by the following Chemical Formula 2, or a divalent substituent represented by the following Chemical Formula 3,

 [Chemical Formula 1]

$R^1$ and $R^2$ each independently being hydrogen or a linear or branched C3 to C5 alkyl group, provided that at least one of $R^1$ and $R^2$ is not hydrogen,

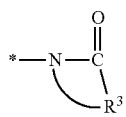 [Chemical Formula 2]

$R^3$ being a C3 to C5 alkylene group, and

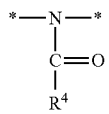 [Chemical Formula 3]

$R^4$ being a linear or branched C3 to C5 alkyl group,
wherein the temperature-sensitive oligomer compound has a number average molecular weight of about 300 to about 1000, and
wherein the hydrophilic functional group is —$NH_2$, —$SO_3H$, or —$PO_3H_2$.

2. The draw solute for forward osmosis of claim 1, further comprising:
a salt compound linked to the hydrophilic functional group.

3. The draw solute for forward osmosis of claim 1, wherein the temperature-sensitive oligomer compound has a number average molecular weight of about 300 to about 800.

4. The draw solute for forward osmosis of claim 1, wherein the structural unit of the temperature-sensitive oligomer compound is selected from the following Chemical Formula 4, Chemical Formula 5, Chemical Formula 6, and a combination thereof:

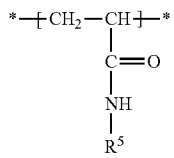 [Chemical Formula 4]

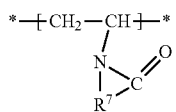 [Chemical Formula 5]

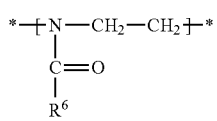 [Chemical Formula 6]

wherein, in Chemical Formulas 4 to 6,
$R^5$ and $R^6$ are each independently a linear or branched C3 to C5 alkyl group, and
$R^7$ is a C3 to C5 alkylene group.

5. The draw solute for forward osmosis of claim 4, wherein the temperature-sensitive oligomer compound comprises n of the structural unit represented by the above Chemical Formula 4, Chemical Formula 5, Chemical Formula 6, and combination thereof, wherein n is an integer from 2 to 30.

6. The draw solute for forward osmosis of claim 1, wherein the structural unit of the temperature-sensitive oligomer compound is derived from a monomer selected from N-isopropylacrylamide (NIPAM), N,N-diethylacrylamide (DEAAM), N-vinylcaprolactam (VCL), and a combination thereof.

7. The draw solute for forward osmosis of claim 1, wherein the temperature-sensitive oligomer compound has a first solubility in water of greater than or equal to about 100 g/L at a temperature of less than a lower critical solution temperature (LCST), and a second solubility in water of less than or equal to about 1 g/L at a temperature of greater than or equal to the lower critical solution temperature (LCST).

8. The draw solute for forward osmosis of claim 7, wherein the lower critical solution temperature (LCST) is about 10 to about 50° C.

9. The draw solute for forward osmosis of claim 1, wherein the temperature-sensitive oligomer compound includes side chains configured to form a first hydrogen bond with water at a temperature of less than a lower critical solution temperature (LCST), and configured to form a second hydrogen bond between the side chains so as to be reversibly self-agglomerated at a temperature of greater than or equal to the lower critical solution temperature (LCST).

10. The draw solute for forward osmosis of claim 1, wherein the temperature-sensitive oligomer compound has a hydraulic radius of about 100 nm to about 10,000 nm at a temperature of greater than or equal to a lower critical solution temperature (LCST).

11. A forward osmosis water treatment device, comprising:
a feed solution including subject materials to be separated for purification;
an osmosis draw solution including the draw solute for forward osmosis according to claim 1;
a semi-permeable membrane having a first side and a second side, the first side contacting the feed solution and the second side contacting the osmosis draw solution;
a recovery system configured to separate and recover the draw solute of the osmosis draw solution; and
a connector configured to reintroduce the draw solute recovered by the recovery system back into the osmosis draw solution contacting the second side of the semi-permeable membrane.

12. The forward osmosis water treatment device of claim 11, further comprising:
an outlet arranged downstream from the recovery system and configured to produce treated water from the osmosis draw solution remaining after the draw solute is separated by the recovery system, the treated water including water that has passed through the semi-permeable membrane from the feed solution by osmotic pressure.

13. The forward osmosis water treatment device of claim 11, wherein the recovery system includes a recovery temperature controller configured to heat the draw solute to greater than or equal to a lower critical solution temperature (LCST) to reversibly self-agglomerate the draw solute.

14. The forward osmosis water treatment device of claim 11, wherein the connector includes a connector temperature controller configured to cool the draw solute recovered by the recovery system to less than the lower critical solution temperature (LCST) to dissemble an agglomeration of the draw solute.

15. The forward osmosis water treatment device of claim 11, wherein the recovery system includes a microfiltration (MF) membrane, an ultrafiltration (UF) membrane, a nanofiltration (NF) membrane, or a centrifuge.

16. A forward osmosis method for water treatment, the method comprising:
  contacting a feed solution and an osmosis draw solution via a semi-permeable membrane positioned therebetween such that feed water in the feed solution passes through the semi-permeable membrane by osmotic pressure and moves to the osmosis draw solution having a higher osmol concentration than the feed solution, the feed solution including impurities to be separated for purification, the osmosis draw solution including the draw solute for forward osmosis according to claim 1;
  heating the osmosis draw solution including the feed water to a temperature above a lower critical solution temperature (LCST) so that the draw solute in the osmosis draw solution is reversibly self-agglomerated;
  separating and recovering the reversibly self-agglomerated draw solute from the osmosis draw solution including the feed water; and
  producing treated water from the osmosis draw solution including the feed water, from which the reversibly self-agglomerated draw solute has been separated therefrom.

17. The forward osmosis method for water treatment of claim 16, further comprising:
  cooling the recovered draw solute to a temperature below the lower critical solution temperature (LCST) so as to dissemble the self-agglomerated draw solute and reintroduce the dissembled draw solute into the osmosis draw solution contacting the semi-permeable membrane.

18. The forward osmosis method for water treatment of claim 16, wherein the lower critical solution temperature (LCST) ranges from about 10 to about 50° C.

* * * * *